Oct. 25, 1960
A. M. KOEHLER ET AL
2,957,336
APPARATUS FOR TESTING HOLLOW ARTICLES BY
HYDRAULIC PRESSURE APPLIED
INTERNALLY THEREOF
Filed Jan. 17, 1955
2 Sheets-Sheet 1
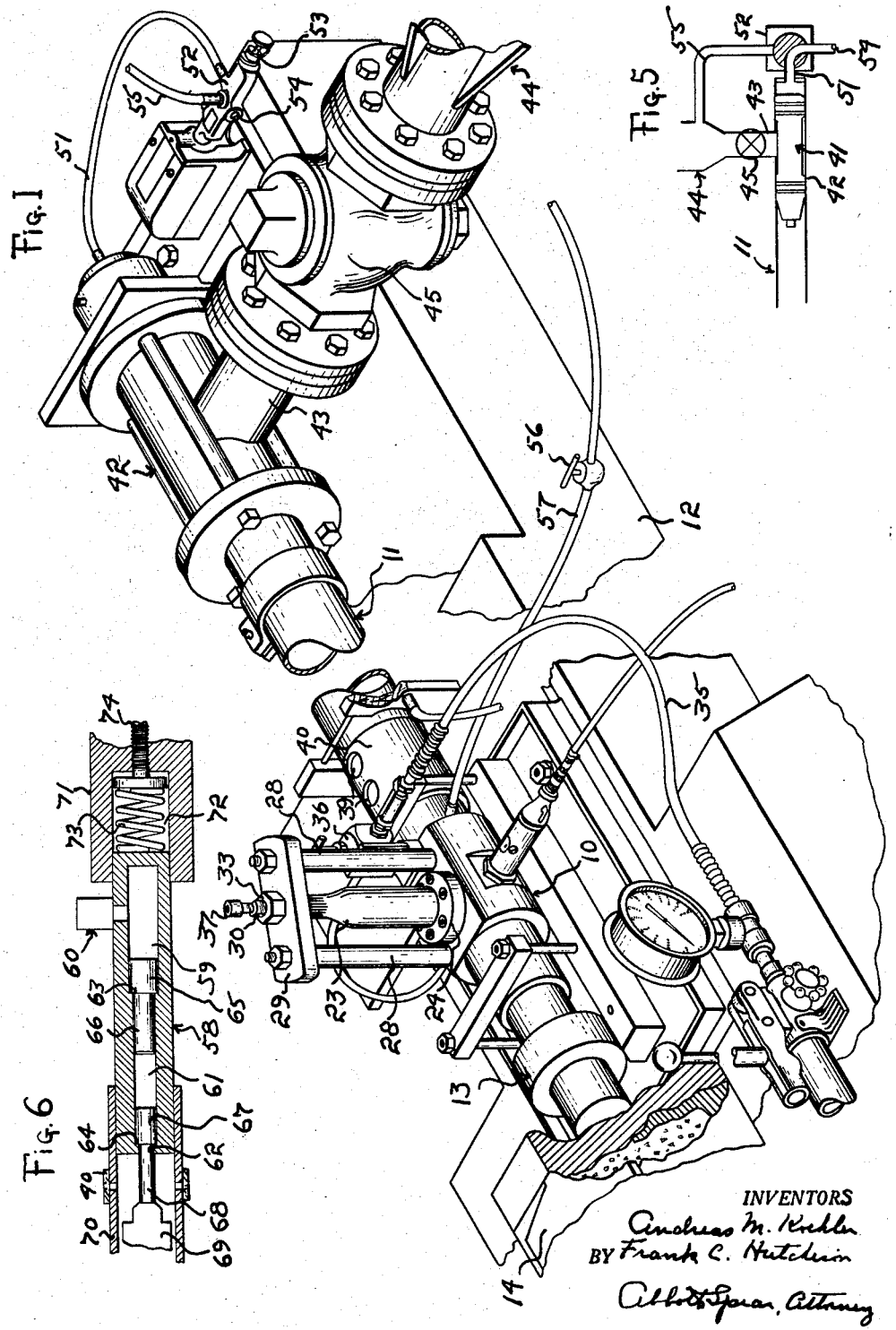
INVENTORS
Andreas M. Koehler
Frank C. Hutchins
BY
Abbott Spear, Attorney

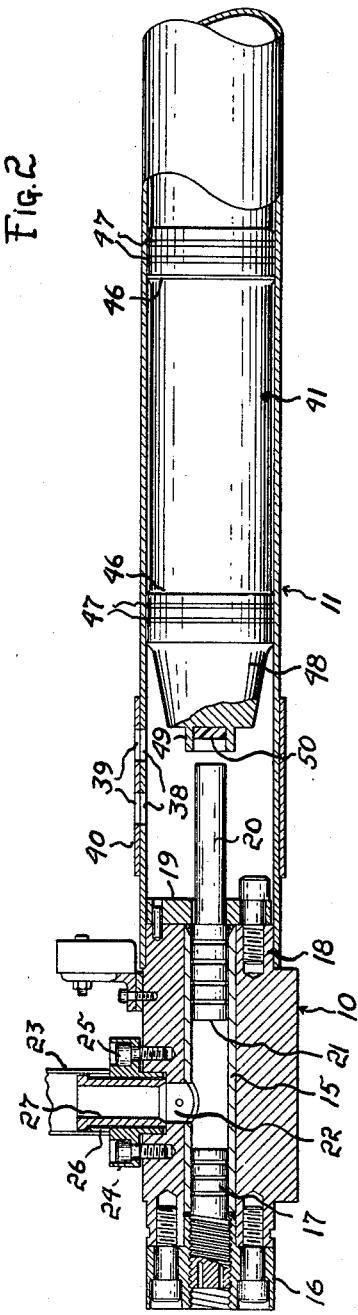

… …

United States Patent Office 2,957,336
Patented Oct. 25, 1960

2,957,336

APPARATUS FOR TESTING HOLLOW ARTICLES BY HYDRAULIC PRESSURE APPLIED INTERNALLY THEREOF

Andreas M. Koehler, Belmont, and Frank C. Hutchison, Cambridge, Mass., assignors, by mesne assignments, to Flightex Fabrics, Inc., Providence, R.I., a corporation of Rhode Island Filed Jan. 17, 1955, Ser. No. 482,152

11 Claims. (Cl. 73—12)

This invention relates to the testing of hollow articles by internally applied pressures of large magnitude and of short duration.

While the invention is adapted to meet a wide range of testing requirements, rocket motors, including those open at both ends as well as those open at one end only, afford excellent examples of hollow articles intended to be capable of withstanding internally applied pressures measurable in many thousands of pounds per square inch.

Not only is it important to find out whether such a hollow article can withstand such a predetermined pressure but also other factors such as the relative strength of different materials and different methods of production must often be determined. The general objective of the invention is to enable the testing of these and other factors to be effected by dynamically loading the articles to closely simulate conditions of use.

This general objective is attained by providing means enabling the interior of the hollow test article to be included as part of a closed hydraulic system having a piston device for applying energy to the contained liquid body. The piston device has a stem exposed for actuation by associated means, either mechanical or pneumatic, for so supplying the required energy input that the desired test pressure is generated and released under conditions approximating those attendant the use of the article. While the invention is concerned with the approximately instantaneous generation and release of high testing pressures, it provides for variations in the pressure-time relationships which, at times, are of interest.

In the accompanying drawings, there are shown illustrative embodiments of the invention from which these and other of its objectives, novel features, and advantages will be readily apparent. In the drawings:

Fig. 1 is a perspective and partly broken away view of testing apparatus in accordance with the invention.

Fig. 2 is a longitudinal, vertical section through the receiver and part of the barrel.

Fig. 3 is a partly sectioned fragmentary side view of the article clamping means.

Fig. 4 is a fragmentary view showing on an enlarged scale, the means locking the article to the receiver.

Fig. 5 is a schematic view of the barrel chamber and the air conduits, and

Fig. 6 is a somewhat schematic view of a modification of the invention.

With reference to Fig. 1, it will be noted that the apparatus comprises a receiver and a barrel, generally indicated at 10 and 11, respectively. These are supported on a suitable base 12 with a backing 13 interposed between the receiver 10 and the backstop 14.

The receiver 10 has a cylinder defining sleeve 15 closed at one end, as may be seen in Fig. 2, by the cap 16 which has a part 17 adjustably protruding into the cylinder, thus to provide means for increasing or decreasing its volume. The other end of the receiver 10 is in the form of a cylindrical hub 18 to which there is secured a head 19 having a bore of smaller diameter than that of the receiver cylinder thus to receive the stem 20 of the piston 21 and to provide a stop therefor opposite the adjustable part 17. Intermediate the part 17 and the thus established stop, there is a port 22.

In order that a hollow article such as the open-ended, necked case 23 may be secured to the receiver 10 with one end closed and the other end in communication with the port 22, the outer end of said port is shown, see Figures 2 and 4, as having a counterbore to receive the internally threaded hub 24 bolted to the receiver 10 by cap screws 25. The case 23 is shown as having an internally threaded adapter 26 sealed in its larger end as by threading it therein and the adapter 26 and the hub 24 are joined by the externally threaded sleeve 27.

The receiver 10 is also provided with two posts 28 interconnected by a header 29 having a threaded bore axially alined with the center of the port 22. A stem 30 is threaded in that header bore and is formed with a head 31 carrying an annular seal 32 and dimensioned to enter and seal the neck of the case 23. This construction has the advantage that the attached case 23 is not confined axially or radially. A lock nut 33 anchors the stem 30 in position. The stem 30 has an axial bore 34 extending from end-to-end thereof to enable the case 23 and the cylinder of the receiver 10 to be vented during the filling thereof with a suitable liquid delivered through the supply conduit 35 shown as having a valve 36. The thus established body of liquid is closed by means of a plug 37 threaded into the upper end of the stem bore 34.

The hub 18 is shown as entrant of one end of the barrel 11 which is provided with ports 38 adapted to register with ports 39 in the sleeve 40 or to be closed by that sleeve, when partially rotated. The bore of the barrel 11 is dimensioned to receive the generally indicated slug 41 and the other end of the barrel is in the form of a closed chamber indicated at 42 and shown as a T thus to provide a conduit 43 by which the barrel is placed in communication with a suitable source of air under pressure, suggested at 44, when the valve 45 is open.

The slug 41, as may best be seen in Fig. 2, has two axially spaced bosses 46 provided with rings 47 and a tapered nose 48 centrally of which there is a seat 49 dimensioned to receive the end of the piston stem 20 and shown as having a resilient cushion 50 located therein to dampen impact vibrations induced in the piston by the impact of the slug 41 on its stem 20.

With reference to Figs. 1 and 5, it will be noted that when the slug 41 is in its chamber 42 and the valve 45 is opened, the slug does not move, as the pressure thereon is balanced. When a test is to be made, the valve 45 is opened and the sleeve 40 is so positioned as to vent the receiver end of the barrel 11. There is a conduit 51 at the chamber end of the barrel 11 in communication with a three-way valve 52 yieldably held by the spring 53 in a position to connect the conduit 51 to the relief port 54. Thus, any air leaking past the slug rings 47 in either direction is vented. When the valve 52 is moved from its normal position, the conduit 51 is connected to the conduit 55 in communication with the air source 44. By these means, the pressure gradually builds up until the slug 41 is advanced into the position in its chamber 42 wherein the main air stream is fully operative against the rear end of the slug 41 to propel it into engagement with the piston stem 20.

It will be appreciated that the impact of the slug 41 on the piston means is attended by the development of hydraulic pressure of high magnitude but of short duration. Should the wall of the article being tested rupture due to the pressure thus exerted thereon, some of the liquid would remain trapped in the cylinder, due to the fact that the port 22 is spaced from the closed end thereof, and thus provide a hydraulic cushion. If the test article survives the test, the slug 41 is returned towards its chamber against the air cushion that exists until the valve 45 is closed and the chamber end of the barrel vented via the relief port 54 when the valve 52 is repositioned by the spring 53.

In order to return the slug 41 to the chamber 42, the sleeve 40 is turned to close the barrel ports 38 and the valve 56 is opened to admit air from the source 44 through the conduit 57 to the receiver end of the barrel.

Mention has been made of the generation of impact vibrations when the slug 41 strikes the piston stem 20. Where lessening of the effect of such vibrations in a test is important, the slug engaged stem and the cylinder closing piston may be arranged as suggested in Fig. 6 in which the receiver is indicated at 58 with its bore stepped to provide a cylinder 59 in communication with the interior of a hollow article 60 to be tested, a second cylinder 61, a port 62, and intermediate shoulders 63 and 64. A piston 65 in the cylinder 59 has its stem 66 entrant of the cylinder 61. Spaced from the stem 66 by a body of liquid in the cylinder 61 is a piston 67 whose stem 68 projects through the port 62 for engagement by the slug 69. It will be noted that the receiver 58 has a zone of appreciable length in the barrel 70 and is slidable relative thereto and to the backstop 71 in whose receiver accommodating chamber 72, there is shown, as indicative of cushioning means, a spring 73 backed by adjustable tensioning means 74.

From the foregoing, it will be appreciated that the invention provides means for making a hollow article a part of a liquid body and for producing therein hydraulic pressures of very large magnitude and of short duration. Variations in both of these factors can be made as, for example, by increasing or decreasing the slug weight or by controlling the air source to increase or decrease the velocity. Important in testing are pressure-time relationships and the time factor of the pressure curves may also be varied. For example, an increase in the volume of the liquid body carries with it a decrease in the maximum pressure and an increase in the time factor. The invention contemplates variations in the volume of the liquid body with means for so doing being represented by the adjustable receiver part 17, see Fig. 2. Flattening of the pressure curve also results when as, in Fig. 6, the receiver itself may move against a cushioned resistance.

From the foregoing, it will be apparent that the invention provides apparatus well adapted for use in developing high stresses, variable as to conditions of time, magnitude of stresses, or both, for testing enclosed vessels and parts thereof.

What we therefore claim and desire to secure by Letters Patent is:

1. In apparatus for approximately instantaneously generating and releasing hydraulic pressures of high values for testing hollow articles, a liquid receiver having an open end and a port between said open end and the other end of said receiver, piston means including a piston and a stem, said piston being reciprocable in said receiver and closing said receiver end against leakage and also closing said port after predetermined movement towards said other receiver end, means to lock an article to the receiver with its interior in communication only with said port thereby enabling said receiver and said article to be filled with liquid, a barrel in which one end of said stem is exposed and which has at its other end a chamber, a slug in said chamber, and a valve controlled source of air under pressure in communication with said chamber and operable to propel said slug along said barrel into engagement with the stem of said piston means.

2. In apparatus for approximately instantaneously generating and releasing hydraulic pressures of high values for testing hollow articles, a liquid receiver having a port and an open end, piston means including a piston and a stem, said piston being reciprocable in said receiver and closing said receiver end against leakage, means to lock an article to the receiver with its interior in communication only with said port thereby enabling said receiver and said article to be filled with liquid, a barrel in which one end of said stem is exposed and which has at its other end a chamber, a slug in said chamber, and a valve controlled source of air under pressure in communication with said chamber and operable to propel said slug along said barrel into engagement with the stem of said piston means, and valve controlled means to place said source in communication with the receiver end of said barrel to return the slug to said chamber.

3. In apparatus for approximately instantaneously generating and releasing hydraulic pressures of high values for testing hollow articles by hydraulic pressure applied internally thereof, a liquid receiver having a port and an open end, piston means including a piston and a stem, said piston being reciprocable in said receiver and closing said receiver end against leakage, means to lock an article to the receiver with its interior in communication only with said port thereby enabling said receiver and said article to be filled with liquid, a barrel having a valve controlled relief port in one end and a chamber at its other end for a slug, said stem being exposed in said first named barrel end, a valve controlled source of air under pressure in communication with said chamber and operable to propel a slug along said barrel into engagement with the stem of said piston means, and valve controlled means to deliver air under pressure into the receiver end of said barrel to return a slug into said chamber.

4. In apparatus for approximately instantaneously generating and releasing hydraulic pressures of high values for testing hollow articles by hydraulic pressure applied internally thereof, a liquid receiver having a port and an open end, piston means including a piston and a stem, said piston being reciprocable in said receiver and closing said receiver end against leakage, means to lock an article to the receiver with its interior in communication only with said port thereby enabling said receiver and said article to be filled with liquid, a barrel having one end vented and in which said stem is exposed and which has at its other end a chamber for a slug in said chamber, a valve controlled source of air under pressure in communication with said chamber intermediate the ends of a slug therein and operable to propel said slug along said barrel into engagement with the stem of said piston means at a predetermined velocity, a vent at the rear end of said chamber, and means to connect said chamber vent to said source thereby to bring said slug into a position in said chamber in which all of said air enters behind said slug.

5. In apparatus for approximately instantaneously generating and releasing hydraulic pressure of high values for testing hollow articles, a liquid receiver having a cylinder open at one end and an upwardly opening port in communication therewith between said open end and the other end of said cylinder, piston means including a piston and a stem, said piston being reciprocable in said cylinder and closing its open end against leakage and also closing said port after predetermined movement towards the closed end of said cylinder until it returns therefrom towards its initial position, means to lock a hollow article to the receiver exteriorly of said cylinder and with its interior in communication only with said port thereby enabling said cylinder and article to be filled with liquid to establish a closed system with respect to each other, said stem being exposed outside of said receiver, and means to deliver a blow on said stem.

6. In apparatus for approximately instantaneously generating and releasing hydraulic pressure of high values for testing hollow articles, a liquid receiver having a cylinder, a plug adjustably threaded in one end of said cylinder to establish a predetermined length thereof, said cylinder being open at the other end and having an upwardly opening port in communication therewith between said open cylinder ends, piston means including a piston and a stem, said piston being reciprocable in said cylinder and closing its open end against leakage and also closing said port after predetermined movement towards the closed end of said cylinder until it returns therefrom towards its initial position, means to lock a hollow article to the receiver exteriorly of said cylinder and with its interior in communication only with said port thereby enabling said cylinder and article to be filled with liquid to establish a closed system with respect to each other, said stem being exposed outside of said receiver, and means to deliver a blow on said stem.

7. In apparatus for approximately instantaneously generating and releasing hydraulic pressures of high values for testing hollow articles, a liquid receiver having a cylinder open at one end and an upwardly opening port in communication therewith between said open end and the other end of said cylinder, piston means including a pair of pistons, each provided with a stem, one piston being reciprocable in said cylinder and closing its open end against leakage and also closing said port after predetermined movement towards the closed end of said cylinder until it returns therefrom towards its initial position, the other piston being hydraulically spaced from the port sealing piston, means to lock a hollow article to the receiver exteriorly of said cylinder and with its interior in communication only with said port thereby enabling said cylinder and article to be filled with liquid to establish a closed system with respect to each other, the stem of said last named piston being exposed outside of said receiver, and means to deliver a blow on said stem.

8. In apparatus for approximately instantaneously generating and releasing hydraulic pressure of high values for testing hollow articles open at both ends, a liquid receiver having a cylinder open at one end and a port in communication therewith between said opened end and the other end of said cylinder, piston means including a piston and a stem, said piston being reciprocable in said cylinder and closing its open end against leakage and also closing said port after predetermined movement towards the closed end of said cylinder, means to lock one end of a hollow article to the receiver, a mount, a seal carrying member supported by said mount for entry into the other end of the article towards said port thereby enabling said cylinder and article to be filled with liquid to establish a closed system with respect to each other, said seal carrying member including a valve controlled port opening through the article entering end thereof, said stem being exposed outside of said receiver, and means to deliver a blow on said stem.

9. In apparatus for approximately instantaneously generating and releasing hydraulic pressure of high values for testing hollow articles, a liquid receiver having a cylinder open at one end and a port in communication therewith between said opened end and the other end of said cylinder, piston means including a piston and a stem, said piston being reciprocable in said cylinder and closing its open end against leakage and also closing said port after predetermined movement towards the closed end of said cylinder, means to lock a hollow article to the receiver with its interior in communication only with said port thereby enabling said cylinder and article to be filled with liquid to establish a closed system with respect to each other, said stem being exposed outside one end of said receiver, and means to deliver a blow on said stem including a barrel in which one end of said receiver is slidably entrant, and an adjustably yieldable stop against which the other end of said receiver is seated.

10. In testing apparatus, a barrel including a chamber at one end and having its other end vented, a slug in said chamber, and a valve controlled source of air under pressure in communication with said chamber between the ends of said slug and blocked thereby and operable to propel said slug along said barrel towards the vented end thereof when the slug is moved forwardly into an unblocking position, and valve controlled means having a first position in which said source is placed in communication with the chamber end rearwardly of said slug to move it into said unblocking position and a second position in which said chamber end is vented.

11. In testing apparatus, a barrel including a chamber at one end and having its other end vented, a slug in said chamber, and a valve controlled source of air under pressure in communication with said chamber between the ends of said slug and blocked thereby and operable to propel said slug along said barrel towards the vented end thereof when the slug is moved forwardly into an unblocking position, and a vent at the rear end of said chamber, and means to connect said chamber vent to said source thereof to advance said slug in said chamber into said unblocking position in which all of said air enters behind it.

References Cited in the file of this patent

UNITED STATES PATENTS

| | | |
|---|---|---|
| 1,282,120 | Patterson | Oct. 22, 1918 |
| 2,341,270 | Deam et al. | Feb. 8, 1944 |
| 2,537,096 | Shreeve et al. | Jan. 9, 1951 |
| 2,610,504 | Nigh | Sept. 16, 1952 |
| 2,696,105 | Mackas | Dec. 7, 1954 |
| 2,743,604 | Stein et al. | May 1, 1956 |
| 2,810,288 | Herron et al. | Oct. 22, 1957 |

FOREIGN PATENTS

| | | |
|---|---|---|
| 319,889 | Great Britain | Oct. 3, 1929 |